United States Patent
Donlon

[15] 3,653,458
[45] Apr. 4, 1972

[54] COMBINED PERIPHERAL JET AND PLENUM CHAMBER AIR CUSHION DEVICE

[72] Inventor: Richard H. Donlon, Troy, Mich.

[73] Assignee: Transportation Technology, Inc., Madison Heights, Mich.

[22] Filed: Oct. 29, 1969

[21] Appl. No.: 872,019

[52] U.S. Cl..............................180/124, 180/116, 180/126, 180/129
[51] Int. Cl.........................................B60v 1/02, B60v 1/04
[58] Field of Search..................180/124, 127, 128, 129, 130, 180/118, 116

[56] References Cited

UNITED STATES PATENTS

| | | | |
|---|---|---|---|
| 3,239,023 | 3/1966 | Jones | 180/128 X |
| 3,252,535 | 5/1966 | Jones | 180/128 |
| 3,331,462 | 7/1967 | Wernicke | 180/116 X |
| 3,347,329 | 10/1967 | Jones | 180/128 |
| 3,384,198 | 5/1968 | Jones et al. | 180/128 |
| 3,424,266 | 1/1969 | Cockerell | 180/118 |

Primary Examiner—A. Harry Levy
Attorney—McGlynn, Reising, Milton & Ethington

[57] ABSTRACT

An air cushion device comprising a base and nozzle means for providing an endless jet curtain beneath the base to confine a cushion of air for supporting the base above a surface when air under pressure is supplied to the nozzle means. A flexible diaphragm is selectively extendable to form a plenum chamber beneath the base having a compliant peripheral wall projecting beneath the base a distance at least as far as the lower end of the nozzle means so as to confine a cushion of air for supporting the base above a surface when air under pressure is supplied to the plenum chamber and permitted to escape only through the clearance slot or gap between the compliant peripheral wall and the surface over which the base is supported.

14 Claims, 3 Drawing Figures

Patented April 4, 1972

3,653,458

INVENTOR.
Richard H. Donlon
BY
Barnard, McGlynn & Reising
ATTORNEYS

COMBINED PERIPHERAL JET AND PLENUM CHAMBER AIR CUSHION DEVICE

This invention relates generally to air cushion devices, and is particularly concerned with an air cushion device capable of operating at different heights for low and high speed operation.

Air cushion devices that have thus far been developed include the type wherein a jet curtain of air under pressure confines a cushion of air for supporting the device above the surface. In another type, a plenum chamber is defined beneath a base or platform which confines a cushion of air when relatively low pressure, super-atmospheric air is supplied to the plenum chamber. As the pressure is increased within the plenum chamber, the differential pressure between the plenum chamber and the surrounding atmosphere causes the device to be lifted above the surface and permits air to escape from the plenum chamber through the gap or slot defined between the periphery of the plenum chamber and the surface over which the device is supported. Air cushion devices have been developed wherein the plenum chamber is defined beneath a substantially rigid base member by a flexible diaphragm and therefore has a compliant wall. The diaphragm defines an inflatable chamber with the rigid base which communicates through openings in the diaphragm with the plenum chamber, and as a result, the portion of the diaphragm defining the periphery of the plenum chamber is held close to the surface over which it operates by the effect of the static pressure within the inflatable chamber. The diaphragm therefore tends to adjust to surface contour and provides a substantially constant thickness leakage slot between the periphery of the plenum chamber and the surface over which the base is supported.

The diaphragm-type air cushion device is attractive for ground transportation because it can operate with exceptionally low air flow. On smooth surfaces, this type of air cushion device has operated satisfactorily with pumping powers low enough to make such devices competitive with or even superior to wheeled systems in terms of rolling resistance versus pumping power. At low speeds, the diaphragm-type air cushion device has many advantages over the peripheral jet type of air cushion device. Because of low air flow, noise is minimal and there is virtually no disturbance of the environment. Thus, there is minimum power consumption, noise, and blowing of loose particles on the ground surface. However, the diaphragm-type or compliant wall type air cushion device operates at clearances above the surface ranging approximately between 0.001 inches and 0.005 inches, and is accordingly limited to low-to-moderate speeds over smooth or specially prepared surfaces. At higher speeds, it is desirable to increase the clearance relative to the surface, or air gap to avoid intermittent contact of the diaphragm with the ground surface due to discontinuities in the surface. The peripheral jet curtain type of air cushion device is, however, capable of operating at greater clearances above the surface depending upon the amount of air flow supplied to the jet nozzle. Consequently, the peripheral jet curtain type of air cushion device is capable of operating at higher speeds and is also capable of accommodating greater surface irregularties.

The copending co-assigned application of Harry A. Mackie and Howard R. Ross filed Aug. 22, 1969, Ser. No. 852,286 and entitled "Combined Plenum Chamber and Jet Curtain Air Cushion Device" discloses an air cushion device including a base with means in the form of a flexible diaphragm secured to the base to define a plenum chamber beneath the base operable to confine a cushion of air to support the device above a surface at heights or clearances in a first range when relatively low pressure, super-atmospheric air is supplied to the plenum chamber defined by the diaphragm. The diaphragm cooperates with the base to define an inflatable chamber with the result that the plenum chamber has a compliant wall, the periphery of which is held close to the surface over which it is operating by the effect of static pressure within the inflatable chamber. A series of elongated slots are formed in the diaphragm which communicates with an endless duct connected with a source of compressed air. The slots define nozzles through which compressed air is directed. The inflatable diaphragm thus provides a compliant wall for operation as a plenum chamber type air cushion device, and the nozzles provide means for forming a jet curtain to increase the operating height or clearance of the device for operation at high speeds.

An object of this invention is to provide an air cushion device having nozzle means for providing a jet curtain type of support and a flexible diaphragm that can be selectively extended to form a compliant peripheral wall of a plenum chamber which when supplied with air under pressure, confines a cushion of air to support the base to thereby permit the device to be selectively operated as a jet curtain type air cushion device for relatively high speed operation and as a compliant wall, plenum chamber type air cushion device for low speed operation in congested areas.

A further object is to provide an air cushion device having a flexible diaphragm for forming a compliant peripheral wall of a plenum chamber and a separate dependent peripheral skirt having a peripheral nozzle means defined therein to provide a jet curtain for operation at high speeds.

A further object is to provide an air cushion device comprising a base, means defining a plenum chamber beneath the base including a flexible diaphragm operable to form a compliant peripheral wall of the plenum chamber such that the plenum chamber is operable to confine a cushion of air to support the device above a surface when air under pressure is supplied to the plenum chamber, and a depending peripheral skirt beneath the base having nozzle means defined therein for providing a curtain of high pressure air to confine a cushion of air for supporting a device above a surface when air under pressure is supplied to the nozzle means.

In carrying out the foregoing, and other objects, an air cushion device according to the present invention includes a base or platform beneath which is carried an endless nozzle for providing a jet curtain to confine a cushion of air to support the base above the surface with a relatively large clearance between the air cushion device and the surface which may be in the range of approximately one-half to three-fourths of an inch. A flexible diaphragm is carried beneath the base and can be extendable to form a peripheral compliant wall of a plenum chamber for confining a cushion of air to support the base above the surface with a relatively small clearance between the peripheral compliant wall and the surface which may be in the range of approximately 0.001 to 0.005 inches. For high speed operation is open or relatively non-congested areas, the jet curtain is brought into operation for supporting the device. However, when the device enters a relatively highly congested area, the diaphragm is extended and the support shifts from the jet curtain confined air cushion to the plenum chamber confined air cushion. The transition can take place abruptly by extending the diaphragm through inflation or the like and shifting the air flow from the jet nozzle to the plenum chamber.

Other objects, advantages and features of the invention will become apparent from the following description taken in connection with the accompanying drawings in which.

Figure 1:
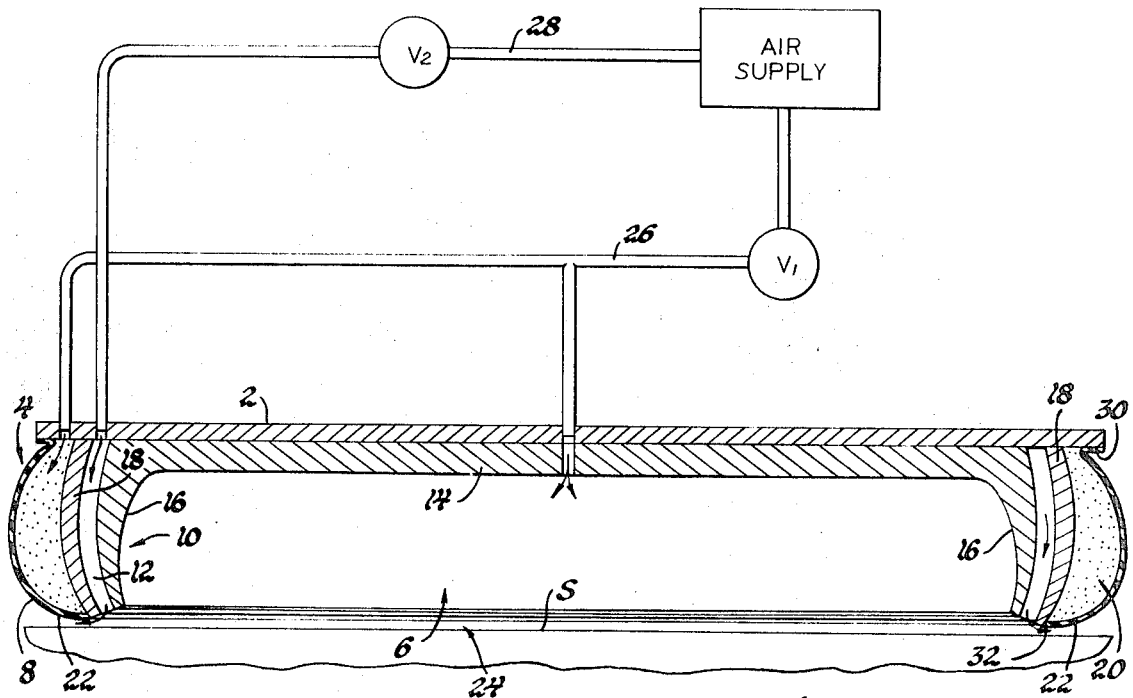
FIG. 1 is a sectional view of an air cushion device embodying one form of the invention.

FIG. 1 discloses an air cushion device comprising a base or platform 2 with means designated generally by reference numeral 4 defining a plenum chamber 6 beneath the base. The means 4 defining the plenum chamber includes a flexible diaphragm 8 extendable when inflated to form a compliant peripheral wall of the plenum chamber 6 so that the plenum chamber 6 is operable to confine a cushion of air to support platform 2 above the surface when air under pressure is supplied to plenum chamber 6. Air in chamber 6 can escape only through the clearance slot or gap between the compliant peripheral wall defined by diaphragm 8 and the surface S over which the base is supported.

A dependent peripheral skirt 10 is defined beneath base 2 and peripheral nozzle means 12 is formed in the peripheral skirt for providing an endless jet curtain of high pressure air beneath the base for confining a cushion of air to support platform or base 2 above a surface when air under pressure is supplied to the nozzle means 12. The nozzle means 12 may be in the form of a single endless slot, or a series of nozzles extending around the periphery defined by the skirt.

The means defining the depending peripheral skirt includes a rigid body portion 14, and inner and outer depending peripheral flanges 16 and 18, respectively, spaced from each other to define the nozzle means 12 therebetween. The inner and outer flanges 16 and 18 are each curved downwardly and inwardly. Skirt 10 cooperates with the diaphragm 8 to define the plenum chamber 6.

Diaphragm 8 cooperates with the outer depending peripheral flange 18 to define an inflatable peripheral chamber 20. Diaphragm 8 is extendable when chamber 20 is pressurized to form an outwardly extending portion 22 which defines a compliant peripheral wall of plenum chamber 6 as well as a compliant wall of a clearance slot or gap designated by reference numeral 24 between the compliant wall 22 of the plenum chamber 6 and the surface S over which the device is supported. A conduit 26 controlled by a valve V1 conducts fluid flow simultaneously to plenum chamber 6 and to the inflatable chamber 20 from a source or supply of air under pressure, and a conduit 28 controlled by a valve V2 conducts fluid flow from the air supply to the peripheral nozzle 12.

Diaphragm 8 has an upper edge 30 secured to the underside of base 2, and a lower edge 32 bonded to the outer flange 18 adjacent the lower periphery thereof.

When the device of FIG. 1 is to be operated at relatively low horizontal speeds over a smooth surface, valve V2 is closed to shut off flow through conduit 28 to the peripheral nozzle 12, and valve V1 is opened to conduct flow of air under pressure simultaneously to plenum chamber 6 and the inflatable chamber 20 to thereby extend and inflate diaphragm 8 to form a compliant peripheral wall 22 for the plenum chamber. Relatively low pressure, super-atmospheric air is permitted to flow through conduit 26 by valve V1. A cushion of air is thus confined in the plenum chamber 6 at greater than atmospheric pressure to cause the device to be lifted above the surface S. Air escapes from chamber 6 through the peripheral clearance slot or gap 24 which, in this mode of operation, is on the order of 0.001 to 0.005 inches.

When it is desired to operate at higher speeds, valve V2 is opened to conduct air to nozzle 12. Valve V2 is operable to permit relatively high pressure air to flow from the air supply to nozzle 12 to provide a peripheral jet curtain operable to confine a cushion of air to support the base above the surface with the height of the clearance gap increased to the order of approximately one-half to three-fourths of an inch. The increased clearance reduces the likelihood of the occurrence of intermittent contact of any part of the structure with the surface, and makes it possible to accommodate greater surface irregularities.

The transition from the jet curtain operation to the compliant wall plenum chamber operation can be brought about abruptly since the compliant wall 22 is located a distance beneath the base at least as great as the lower end of the peripheral skirt 10 when diaphragm 8 is extended upon inflation of chamber 20. The static pressure in chamber 20 maintains the compliant wall portion 22 in close proximity to the surface S.

The increase in clearance, or the increase in the height of slot 24, may be gradually brought about by the gradual increase of air flow through nozzle 12, or there can be an abrupt transition to jet curtain operation by abruptly opening valve V2 to supply high pressure air to the peripheral nozzle 12.

Figure 2:
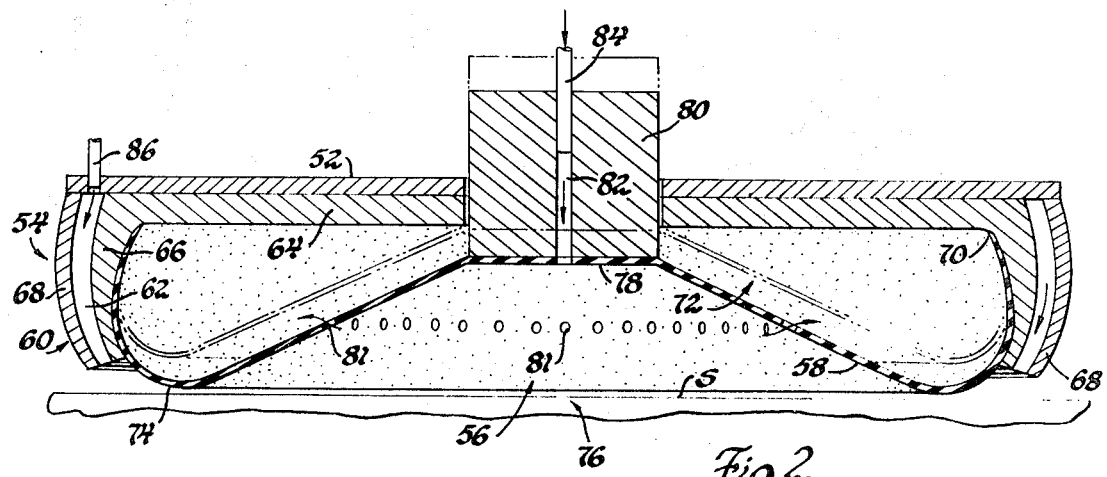
FIG. 2 is a sectional view of an air cushion device embodying a second form of the invention.

FIG. 2 illustrates an air cushion device comprising a base or platform designated by reference numeral 52 with means designated generally by reference numeral 54 defining a plenum chamber 56 beneath the base 52 including a flexible diaphragm 58 operable when extended to form a compliant peripheral wall of the plenum chamber 56 so that the plenum chamber is operable to confine a cushion of air to support base 2 above a surface when air under pressure is supplied to the plenum chamber 56. A dependent peripheral skirt 60 is defined beneath the base, and nozzle means 62 is defined in skirt 60 for providing an endless jet curtain of high pressure air beneath the base for confining a cushion if air to support the base 2 above the surface when air under pressure is supplied to the nozzle means 62.

The dependent peripheral skirt 60 is defined by an inner flange 66 depending from a body portion 64 and an outer depending peripheral flange 68 which is spaced from flange 66 to define the nozzle opening or openings 62. Nozzle 62 may be in the form of an uninterrupted peripheral slot, or a series of nozzles or passages defined between flanges 66 and 68 but separated from each other. The inner and outer peripheral flanges 66 and 68 are each curved downwardly and inwardly beneath the base 2.

Diaphragm 58 has a peripheral edge 70 secured beneath the base adjacent the inner flange 66 and forms an inflatable chamber 72 with the base, or with the body portion 64. Diaphragm 58 is extendable when the inflatable chamber 72 is pressurized to form an outwardly extending portion 74 which defines a compliant peripheral wall of plenum chamber 56 as well as a compliant wall of a clearance or leakage slot or gap 76 for the plenum chamber which defines the space between the surface S over which the device is supported and the compliant wall 74 of the plenum chamber.

Diaphragm 58 has a central portion 78 extending inwardly from the outwardly extending portion 74 toward the base for defining the plenum chamber 56, and the central portion 78 of the diaphragm is axially movable toward and away from the base portion to selectively change the configuration of the plenum chamber, and to selectively retract and extend the lower compliant periphery of chamber 56 defined by portion 74. A cylindrical connector 80 is mounted in the base member for selective movement along the central axis thereof, and the central portion 78 of diaphragm 58 is secured to the lower end of the cylindrical connector. Thus, axial movement of the cylindrical connector causes axial movement of the center of the central portion 78 to change the configuration of chamber 56 and the operating characteristics thereof. Openings 81 are provided in the central portion 78 to provide communication between the plenum chamber 56 and the inflatable chamber 72 to balance the pressure between the two chambers. The cylindrical connector 80 is formed with an axial passage 82 connected with a conduit 84 to conduct air into the plenum chamber 56 from a source of air under pressure. Similarly, a conduit 86 connected with an air supply as in the previously described embodiment of FIG. 1 conducts high pressure air to the peripheral nozzle 62. The air supply to conduits 84 and 86 may be controlled in the same manner as in the previously described embodiment of FIG. 1.

When the device of FIG. 2 is to be operated at relatively low horizontal speeds over a smooth surface, flow from the air supply through conduit 86 is shut off, and connector 80 is extended to the full line position shown in FIG. 2. Relatively low pressure, super-atmospheric air is supplied through conduit 84 to plenum chamber 56 to first inflate diaphragm 58 through openings 81 formed in the diaphragm, and then to provide a cushion of air confined by the plenum chamber at a pressure greater than the ambient pressure to cause the device to be lifted above the surface and permit escape of air through clearance slot 76. The pressure in the inflatable chamber tends to hold the outwardly extending portion 74 of the diaphragm close to the surface. As in the previously described embodiment, the clearance, or thickness of the leakage slot is in the order of 0.001 to 0.005 inches at the relatively low air flow through conduit 84.

For operation at higher horizontal speeds, air is conducted to nozzle 62 through conduit 86. A peripheral jet curtain is formed which confines a cushion of air beneath the base. Connector 80 may be retracted to the phantom line position to retract the diaphragm 58 such that the base is supported solely by the air cushion confined by the jet curtain emanating from nozzle 62.

The transition from the jet curtain operation can be brought about by returning the connector 80 to the full line position illustrated in FIG. 2 and conducting relatively low pressure, super-atmospheric air through conduit 84 and while shutting off the relatively high pressure flow through conduit 86. By raising and lowering the connector 80, the effect of the jet curtain is respectively increased and decreased. The transition can be brought about gradually or abruptly as in the FIG. 1 embodiment.

Figure 3:
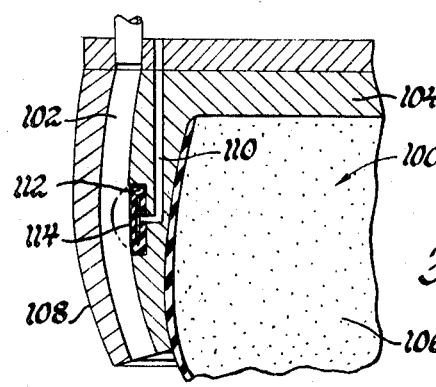
FIG. 3 is a fragmentary sectional view of a modification of the embodiments of FIGS. 1 and 2 wherein means is provided for selectively varying the size of the peripheral nozzle to change the velocity of flow through the nozzle.

FIG. 3 illustrates a modified construction applicable to either of the embodiments of FIGS. 1 and 2. Reference numeral 100 indicates a depending peripheral skirt corresponding to skirts 10 and 60 of FIGS. 1 and 2, respectively. Skirt 100 includes an inner peripheral dependent flange 106 and an outer peripheral dependent flange 108 with an endless nozzle 102 formed therebetween.

Formed in the inner flange 106 is a passage 110 which may be connected with a source of fluid under pressure. Passage 110 terminates in a groove 112 extending around the inner periphery of flange 106 or the inner wall of nozzle 102. Received in groove 112 is an inflatable tube 114 in fluid communication with passage 110. Consequently, the size of the air passage through nozzle 102 can be decreased by selectively pressurizing and inflating tube 112 as indicated in phantom lines in FIG. 3.

While specific examples of the invention have been illustrated and described in the foregoing specification and accompanying drawings, it should be understood that the invention is not limited to the exact construction shown but that various alterations in the construction and arrangement of parts is possible without departing from the scope and spirit of the invention.

The embodiments of the invention in which an exclusive property or privilege is claimed are defined as follows:

1. An air cushion device comprising: a base member; an endless, rigid skirt depending beneath said base member and defining a plenum chamber with said base member; nozzle means defined in said skirt for providing a curtain of high pressure air for confining a cushion of air to support the device above a surface when high pressure air is supplied to said nozzle means; a flexible inflatable diaphragm mounted beneath said base member and operable, when inflated, to cooperate with said skirt and provide an endless, compliant wall for said plenum chamber projecting beneath said base member a distance at least as far as the lower edge of said skirt; and means for admitting air under pressure into said inflatable diaphragm, whereby said diaphragm, when inflated, defines a leakage slot for said plenum chamber.

2. An air cushion device as claimed in claim 1 wherein said skirt comprises inner and outer depending flanges spaced from each other to define said nozzle means therebetween.

3. An air cushion device as claimed in claim 2 wherein said inner and outer flanges are each curved downwardly and inwardly.

4. An air cushion device as claimed in claim 3 wherein said diaphragm cooperates with said outer depending peripheral flange to define an inflatable chamber.

5. An air cushion device as claimed in claim 4 further including means for conducting fluid flow to said plenum chamber and to said inflatable chamber, and means for conducting fluid flow to said nozzle means.

6. An air cushion device as claimed in claim 4 wherein said diaphragm has an upper edge secured to said base and a lower edge secured to said outer flange.

7. An air cushion device as claimed in claim 3 wherein said diaphragm has a peripheral edge secured beneath said base adjacent said inner flange and forms an inflatable chamber with said base.

8. An air cushion device as claimed in claim 7 wherein said diaphragm, when inflated, has an outer peripheral wall engaging said inner flange and a central portion extending inwardly toward said base with a portion at the juncture of said central portion with said outer peripheral wall defining the compliant wall of said plenum chamber.

9. An air cushion device as claimed in claim 8 further including means for moving the central portion of said diaphragm toward and away from said base portion to selectively change the configuration of said inflatable chamber.

10. An air cushion device as claimed in claim 9 wherein said last named means comprises a cylindrical connector mounted in said base member for selective movement along the central axis thereof, and wherein the central portion of said diaphragm is secured to said cylindrical connector.

11. An air cushion device as claimed in claim 10 further including openings in said central portion providing communication between said plenum chamber and inflatable chamber.

12. An air cushion device as claimed in claim 11 wherein said cylindrical connector is formed with an axial passage to conduct air into said plenum chamber.

13. An air cushion device as claimed in claim 1 including means for selectively varying the size of the air passage in said nozzle means.

14. An air cushion device as claimed in claim 13 wherein said last named means includes an inflatable tube received in said nozzle means selectively inflatable to decrease the size of the passage through said nozzle means.

* * * * *